United States Patent
Sarma

(10) Patent No.: US 7,681,076 B1
(45) Date of Patent: *Mar. 16, 2010

(54) METHOD AND AN APPARATUS TO PERFORM FAST LOG REPLAY

(75) Inventor: Joydeep Sen Sarma, Sunnyvale, CA (US)

(73) Assignee: Network Appliance, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/150,863

(22) Filed: Apr. 30, 2008

Related U.S. Application Data

(63) Continuation of application No. 10/971,209, filed on Oct. 22, 2004, now Pat. No. 7,376,866.

(51) Int. Cl.
*G06F 11/00* (2006.01)

(52) U.S. Cl. .............................. 714/16; 714/15; 714/20

(58) Field of Classification Search ....................... None
See application file for complete search history.

(56) References Cited

U.S. PATENT DOCUMENTS

| | | | |
|---|---|---|---|
| 5,414,840 A | 5/1995 | Rengarajan et al. | |
| 5,974,425 A | 10/1999 | Obermarck et al. | |
| 6,065,018 A | 5/2000 | Beier et al. | |
| 6,119,128 A | 9/2000 | Courter et al. | |
| 6,658,590 B1 | 12/2003 | Sicola et al. | |
| 6,981,114 B1 | 12/2005 | Wu et al. | |
| 7,305,421 B2 * | 12/2007 | Cha et al. | 707/202 |
| 2003/0097611 A1 | 5/2003 | Delaney et al. | |
| 2004/0078658 A1 | 4/2004 | Park et al. | |
| 2005/0165865 A1 | 7/2005 | Farmer | |

OTHER PUBLICATIONS

"Improving the performance score of multi-thread sequential read", May 1, 2000, IBM Technical Disclosure Bulletin, May 2000, UK, Issue 433, p. 954.*

* cited by examiner

*Primary Examiner*—Gabriel L Chu
(74) *Attorney, Agent, or Firm*—Blakely, Sokoloff, Taylor & Zafman LLP

(57) ABSTRACT

A method and an apparatus to perform fast log replay have been disclosed. In one embodiment, the method includes preloading a buffer with data based on a catalog in response to a failure of a storage server and replaying a log as the buffer is being preloaded, wherein replaying the log comprises re-executing a set of modifying operations previously logged in a local non-volatile storage device in the storage server using the data preloaded.

10 Claims, 7 Drawing Sheets

METHOD AND AN APPARATUS TO PERFORM FAST LOG REPLAY

RELATED APPLICATIONS

This application is a continuation of U.S. patent application Ser. No. 10/971,209, filed on Oct. 22, 2004 now U.S. Pat. No. 7,376,866, which is assigned to the same assignees as the present application.

FIELD OF INVENTION

The present invention relates to networked storage systems, and more particularly, to performing fast log replay in disaster recovery.

BACKGROUND

A networked storage system may include one or more storage servers, which may be storage appliances. A storage server may provide services related to the organization of data on mass storage devices, such as disks. Some of these storage servers are commonly referred to as filers or file servers. An example of such a storage server is any of the Filer products made by Network Appliance, Inc. in Sunnyvale, Calif. The storage appliance may be implemented with a special-purpose computer or a general-purpose computer. Depending on the application, various networked storage systems may include different numbers of storage servers.

In a conventional networked storage system, log replay is commonly performed to recover from a failure or a fault in the storage server. The operating system of the storage server maintains a log of operations of transactions such as write operations directed to the mass storage devices that have to be replayed or re-executed in a local non-volatile storage device. Thus, the log may be referred to as an "nvlog." However, the replay is usually slow, because the operations are replayed serially in the same order as they had been stored in the log, and each operation may use data that has to be fetched from multiple mass storage devices or an internal memory of the storage server. Many of the accesses to the mass storage devices incur high latency.

One existing approach to solving the above problem is to issue loads of transactions in parallel for a large number of replay operations, such as two hundred loads. Then the operations are replayed serially. This approach makes more efficient use of spindle resources in the mass storage devices (e.g., disks) by queuing large numbers of input/output requests to the mass storage devices at once and reduces the latency per operation. However, a significant amount of time is still wasted in fetching and loading data used by the operations. An alternative approach towards speeding up log replay is to parallelize the load operations of transactions in the log. This approach is much more complex because of dependencies amongst the transactions.

SUMMARY

The present invention includes a method and an apparatus to perform fast log replay. In one embodiment, the method includes preloading a buffer with data based on a catalog in response to a failure of a storage server and replaying a log as the buffer is being preloaded, wherein replaying the log comprises re-executing a set of modifying operations previously logged in a local non-volatile storage device in the storage server using the data preloaded.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
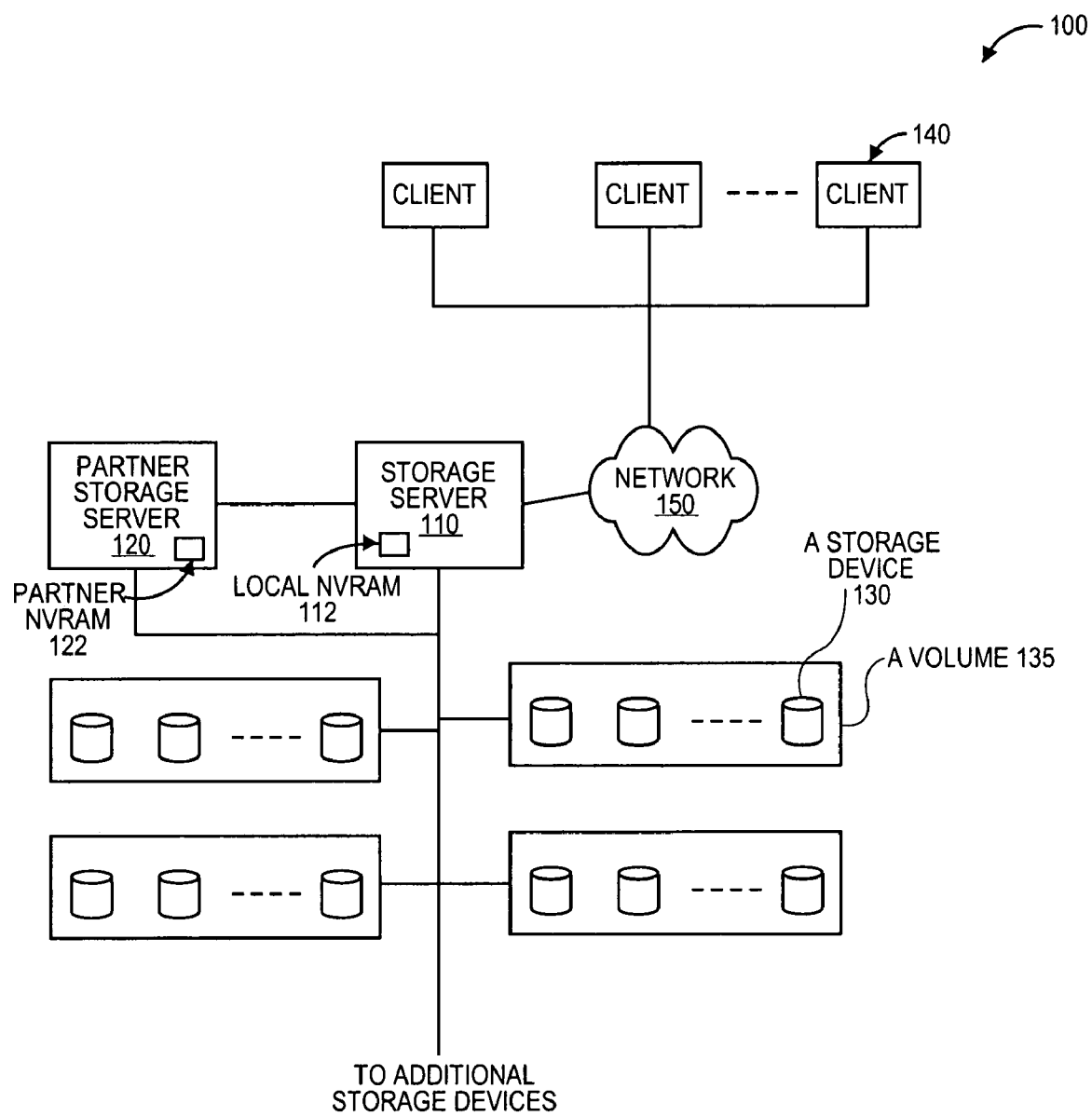
FIG. 1 illustrates an exemplary embodiment of a networked storage system.

A method and an apparatus to perform fast log replay is described. In the following description, numerous specific details are set forth. However, it is understood that embodiments of the invention may be practiced without these specific details. In other instances, well-known components, structures, and techniques have not been shown in detail in order not to obscure the understanding of this description.

Some portions of the following detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the current description, a method and an apparatus to perform fast log replay in a networked storage system are disclosed. In one embodiment, the method includes preloading a buffer with data based on a catalog in response to a failure of a storage server and replaying a log as the buffer is being preloaded, wherein replaying the log comprises re-executing a set of modifying operations previously logged in a local non-volatile storage device in the storage server using the data preloaded. By preloading the buffer with data used in the modifying operations, the modifying operations may not have to wait for the fetching and loading of the data during the log replay. Hence, the log replay becomes faster and more efficient.

FIG. 1 shows a networked storage system useable with some embodiments of the present invention. The system 100 includes a storage server 110, a partner storage partner 120, a network 150, a number of mass storage devices 130 coupled to the storage server 110, and a number of client machines 140 coupled to the storage server 110 via the network 150. The network 150 may include a wide area network (WAN), a local area network (LAN), etc. The mass storage devices 130 may include a number of magnetic disks organized in volumes 135. The volumes 135 may include one or more Redundant Array of Independent Disks (RAID) volumes.

In one embodiment, data is stored and transferred in units of files in the system 100. Therefore, the system 100 may be referred to as a file-based networked storage system. In one embodiment, the system 100 is a network-attached storage (NAS) system that transmits data at the file level. In the NAS system, complete files are retrieved instead of segments on a disk. The NAS system uses file access protocols to retrieve data, such as, for example, Network File System (NFS), or Common Internet File System (CIFS). The NAS systems may be implemented in a single server or in separate servers. The files are logically arranged into directories. A volume 135 may be mapped to one or more directories. Alternatively, the system 100 may include a storage area network (SAN) to transmit read/write requests at the block level of the storage server 110. A block is the basic unit used to store data in the SAN.

In some embodiments, the storage server 110 logs the modifying operations associated with a transaction in a log stored in a local NVRAM 112. This log may be referred to as an nvlog. The log may be mirrored to the partner NVRAM 122 in the partner storage server 120. The storage server 110 may check which buffers' data in the storage server is used by the modifying operations in the transaction and catalog the buffers corresponding to the data used. A buffer is used to hold a piece of storage system data, which may include either internal data (e.g., data used by the storage server itself to provide storage service) or external data (e.g., data belonging to a user). The data in the buffer may be described by several parameters, such as fsid, fileid, level, and fbn. The parameter fsid is an identifier of the volume. The parameter fileid is an inode number of a file within the volume. The level indicates the level of the data in the buffer within a logical buffer tree (also known as a buftree). The parameter fbn is the logical block number of the buffer within the file or the inode. Details on how to catalog buffers are discussed below with reference to FIG. 3A. The catalog may be stored in an internal memory of the storage server 110 and a copy of the catalog may be stored in the local NVRAM 112. In one embodiment, the storage server 110 mirrors the catalog from the local NVRAM 112 to the partner NVRAM 122 in the partner storage server 120. When a failure or a fault occurs in the storage server 110, the storage server 110 may be rebooted or the partner storage server 120 may take over the responsibilities of the storage server 110 to continue managing the mass storage devices 130. In the later case, the configuration of the system 100 may also be referred to as clustered failover configuration (CFO).

If the storage server 110 is rebooted, the storage server 110 may preload buffers with data according to entries in the catalog in the local NVRAM 112 and replay the logged operations according to the nvlog. Alternatively, if the partner storage server 120 takes over the responsibilities of the storage server 110, the partner storage server 120 may preload buffers with data according to entries in the catalog in the partner NVRAM 122 and replay operations according to a copy of the nvlog in the partner NVRAM 122. In one embodiment, the data is preloaded with data from at least one of the mass storage devices 130, an internal memory of the storage server 110, or an internal memory of the partner storage server 120. Details on how to preload buffers are discussed below.

Note that any or all of the components of system 100 and associated hardware may be used in various embodiments of the present invention. However, it can be appreciated that other configurations of the networked data storage system may include more or fewer devices discussed above.

Figure 2A:
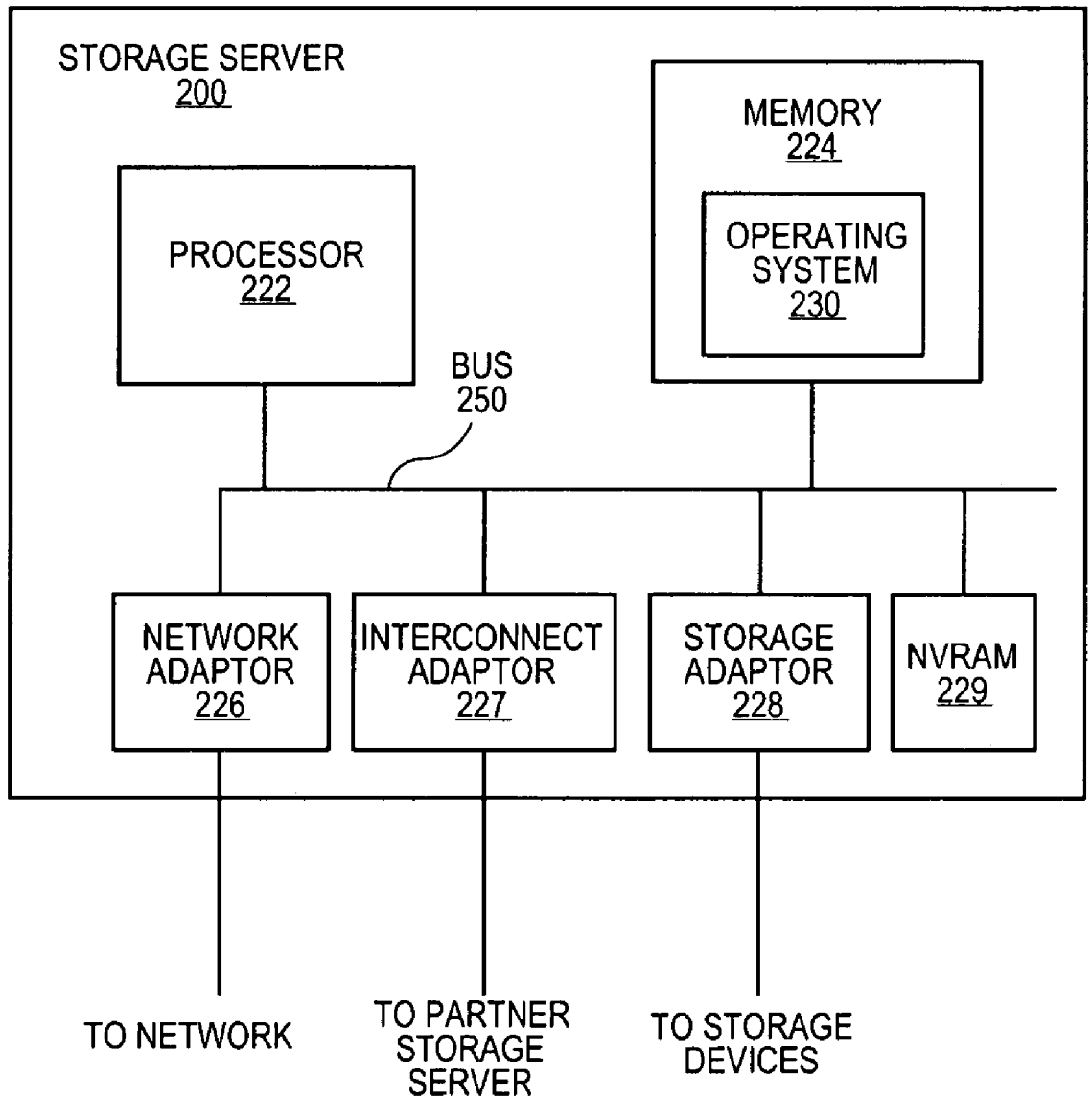
FIG. 2A illustrates one embodiment of a storage server.

Additional details of one embodiment of the storage server 110 are illustrated in FIG. 2A. The storage server 200 includes a processor 222, a memory 224, a network adaptor 226, a storage adaptor 228, an interconnect adaptor 227, and a non-volatile storage device (NVRAM) 229, which are coupled to each other via a bus 250. In one embodiment, the storage server 200 is within a network and the network adaptor 226 interfaces with the network. The network may include a local area network (LAN), or a wide area network (WAN), etc. Data is transmitted between the storage server 200 and the network via the network adaptor 226. When data is received, the network adaptor 226 may forward the data to the storage adaptor 228, the memory 224, or the processor 222. In one embodiment, the storage server 200 is incorporated into a storage system adopting a cluster failover configuration (CFO). Therefore, the interconnect adaptor 227 couples the storage server 200 to a partner storage server.

In one embodiment, the processor 222 reads instructions from the memory 224 and executes the instructions. The memory 224 may include any of various types of memory devices, such as, for example, random access memory (RAM), read-only memory (ROM), flash memory, one or more mass storage devices (e.g., disks), etc. In one embodiment, the memory 224 stores instructions of an operating system 230. The processor 222 may retrieve the instructions from the memory 224 to run the operating system 230. The processor 222 responds to requests from client machines (e.g., the clients 140 in FIG. 1), the network management station, or other storage servers and organizes data on the storage devices (e.g., magnetic disks) coupled to the storage server 200. The storage server 200 interfaces with the storage devices via the storage adaptor 228. The storage server 200 further includes the NVRAM 229, which may store a log and/or a catalog, details of which are discussed below.

Figure 2B:
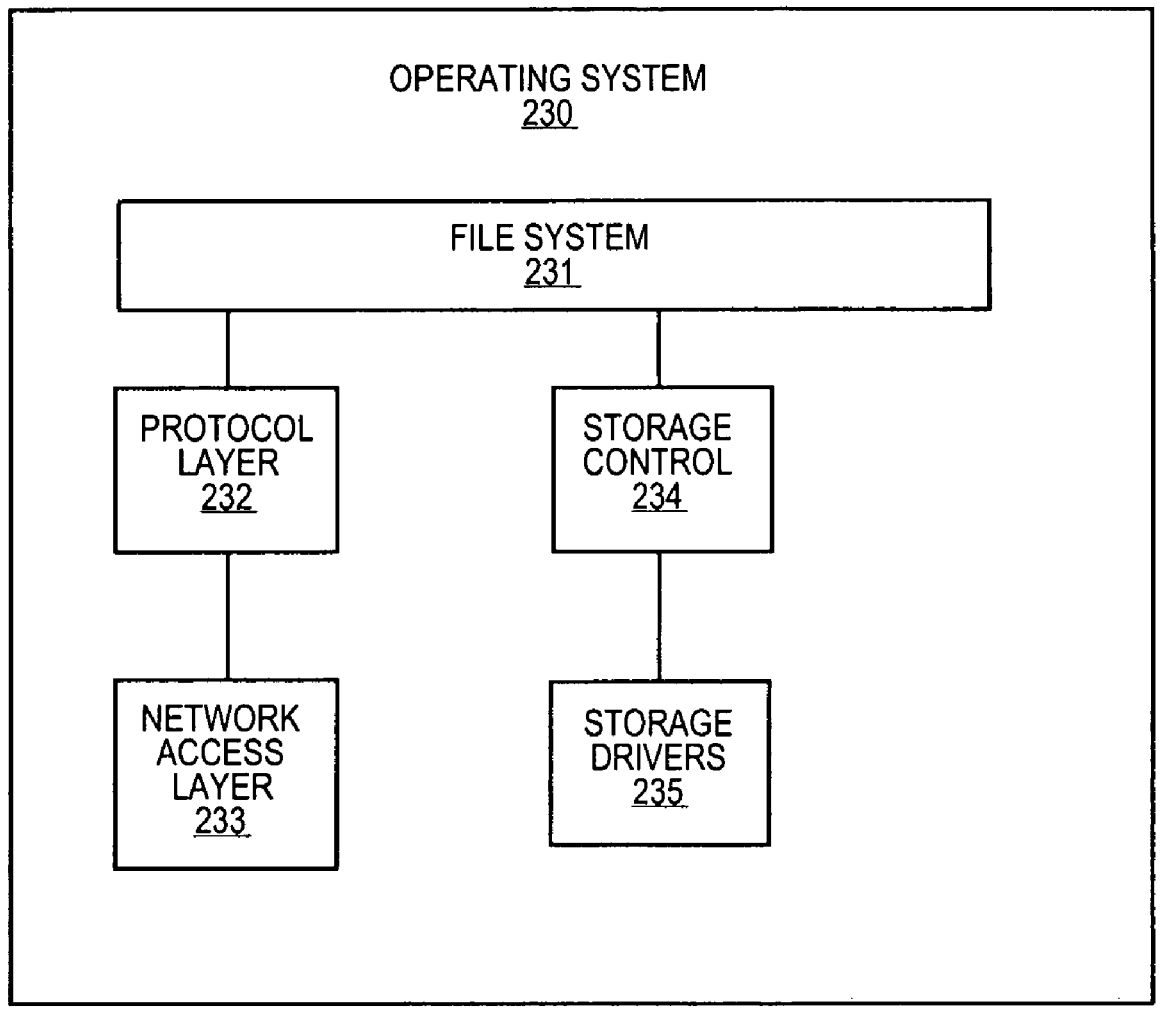
FIG. 2B illustrates one embodiment of an operating system of a storage server.

FIG. 2B illustrates the operating system 230 in greater details according to one embodiment of the invention. The operating system 230 includes a file system 231, a protocol layer 232, a network access layer 233, a storage control module 234, and a set of storage drivers 235. Note that different embodiments of the operating system 230 may include more or fewer modules and/or components than those shown in FIG. 2B.

In one embodiment, the file system 231 is a programmatic entity that imposes structure on an address space of the storage devices (e.g., the mass storage device 130 in FIG. 1) of the storage server 200. This enables the storage server 200 to conveniently deal with data containers, such as files and blocks. The file system 231 may execute read and write operations on the storage devices in response to client requests, maintain directories of stored data, etc.

The file system 231 is logically coupled to the protocol layer 232 and the associated network access layer 233. The protocol layer 232 and the network access layer 233 allow the storage server 200 to communicate over a network (e.g., the network 150 in FIG. 1) with other devices within the system, such as clients and/or other storage servers. The protocol layer 232 may implement any of various protocols, such as Network File System (NFS), Common Internet File System (CIFS), and/or Hypertext Transfer Protocol (HTTP). The network access layer 233 includes one or more drivers that implement one or more protocols to communicate over the network, such as Ethernet.

The file system 231 further includes the storage control module 234 and the storage drivers 235. The storage control module 234 and the storage drivers 235 allow the storage server 200 to communicate with storage devices, such as the mass storage device 130 in FIG. 1. The storage control module 234 may implement a disk storage protocol, such as Redundant Array of Independent Disks (RAID), while the storage drivers 235 may implement a lower level storage device access protocol, such as Fibre Channel (FC) or Small Computer System Interface (SCSI).

Figure 3A:
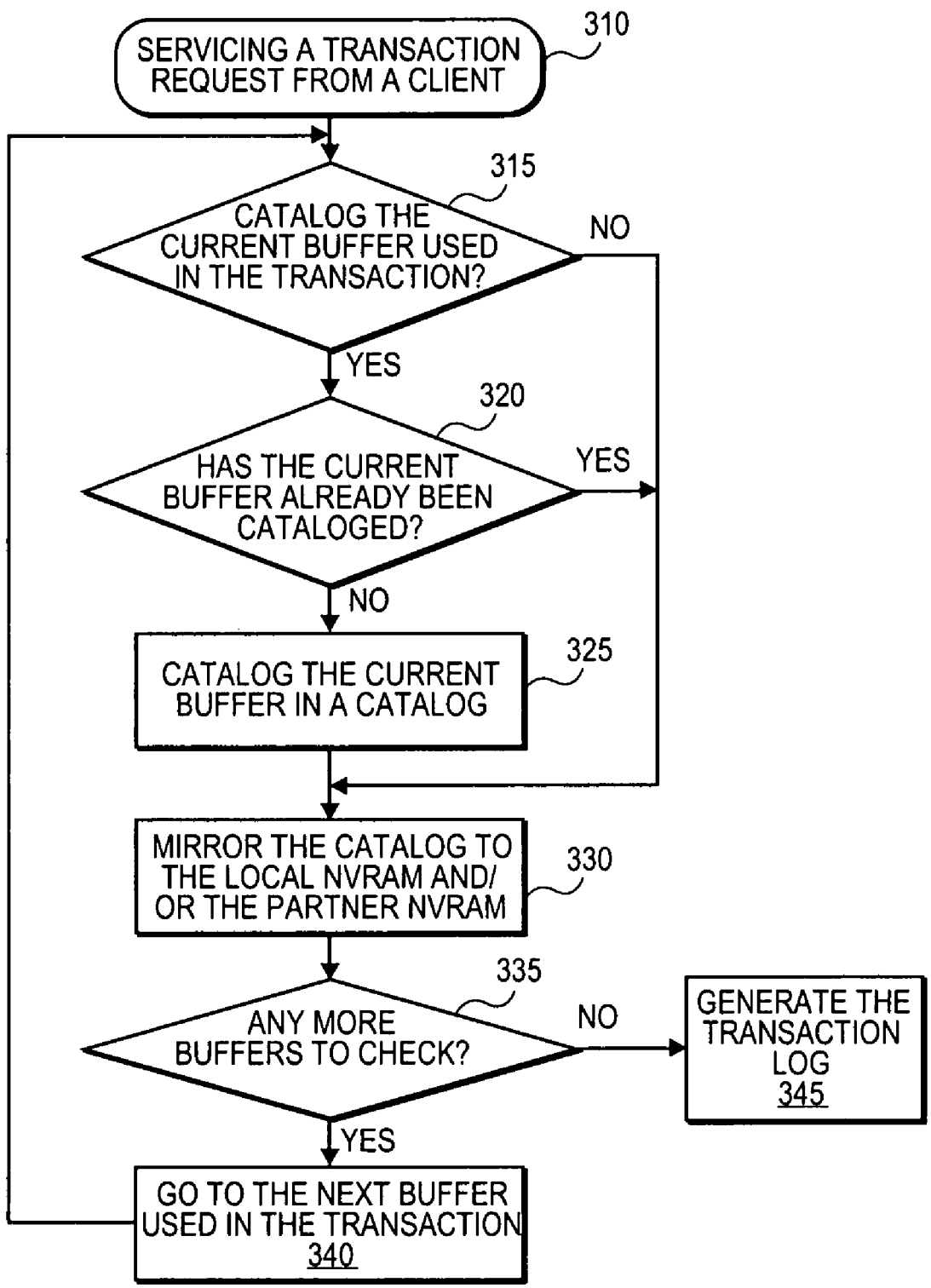
FIG. 3A illustrates a flow diagram of one embodiment of a process to catalog buffers.

FIG. 3A illustrates a flow diagram of one embodiment of a process to catalog buffers. The process is performed by processing logic that may comprise hardware (e.g., circuitry, dedicated logic, etc.), software (such as is run on a general-purpose computer system or a dedicated machine, such as the storage server 110 in FIG. 1), or a combination of both.

In one embodiment, processing logic services a transaction request from a client (e.g., the client 140 in FIG. 1) (processing block 310). Processing logic determines whether a current buffer used in the transaction has to be cataloged (processing block 315). Various conditions may be used in different embodiments to determine whether to catalog the current buffer. For example, the current buffer may be cataloged if data in the current buffer is used by a modifying operation, which modifies the data stored in the networked storage system in the transaction (e.g., a write operation, a create file operation, a delete file operation, etc.). On the other hand, the current buffer may not be cataloged if the data in the current buffer is used by a non-modifying operation, such as a read operation. In some embodiments, processing logic further checks whether the content in the buffer is going to be changed due to the modifying operation. If yes, processing logic catalogs the buffer. Otherwise, processing logic may not catalog the buffer. In addition to, or as an alternative to, the criteria discussed above, processing logic may decide whether to catalog the buffer based on the type of the buffer. For instance, in one embodiment, processing logic may catalog the following types of buffers: direct buffers of an inode file and metafiles, direct buffers of directories, and indirect level-1 buffers of regular user files.

If processing logic has determined not to catalog the current buffer, processing logic transitions to processing block 330. Otherwise, processing logic transitions to processing block 320. Processing logic further determines whether the current buffer has already been cataloged (processing block 320). For example, a buffer (e.g., an indirect level-1 buffer) storing the location of a piece of data used in a previous transaction may have already been cataloged. Thus, the same buffer may not be cataloged again even though the same piece of data is used in the current transaction. If the buffer has already been cataloged, processing logic transitions to processing block 330. Otherwise, processing logic catalogs the current buffer in a catalog (processing block 325). To catalog a buffer, processing logic may append the entries in the buffer at the end of a section of the catalog and update the number of entries in the section. Details of one embodiment of a catalog are discussed below.

The size of the catalog varies in different embodiments. In some embodiments, the catalog size is fixed at 1 MB. Alternatively, the size of the catalog may be variable based on the platform of the networked storage system. For instance, on a predetermined type of platform, the catalog may have a size of 1 MB, while on other types of platform, the catalog may only be 0.5 MB.

Figure 4:
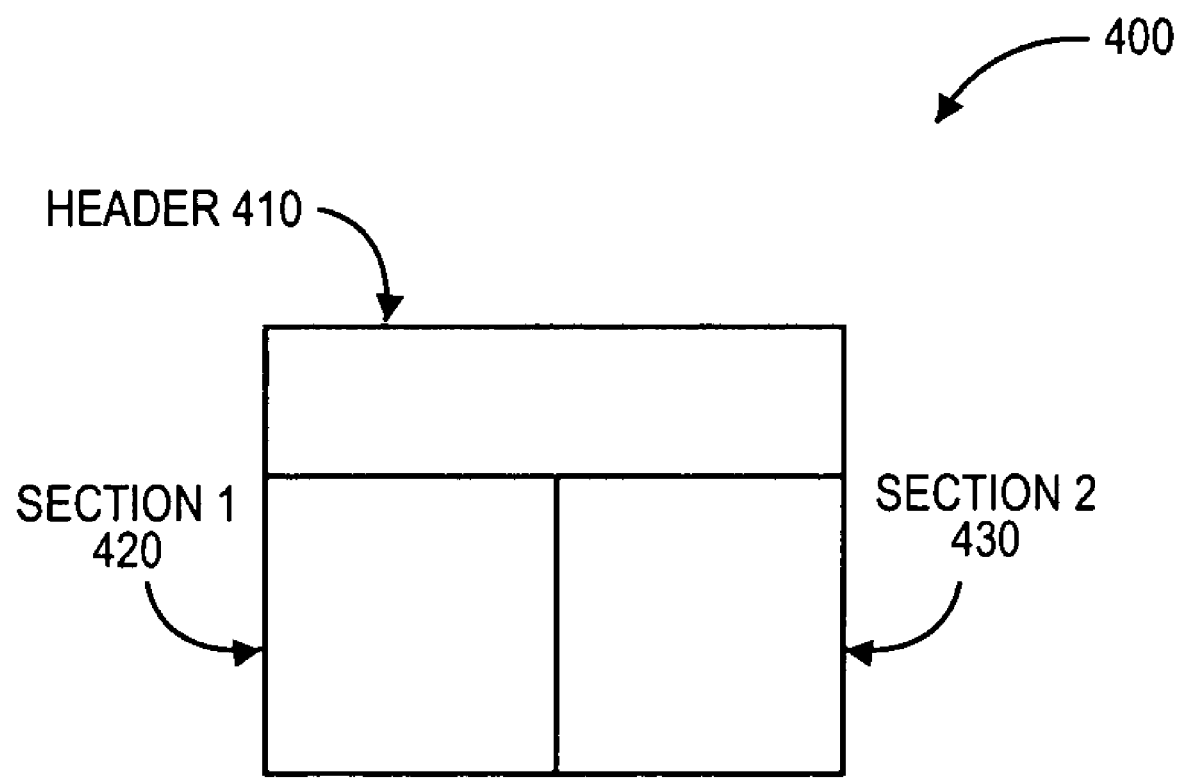
FIG. 4 illustrates one embodiment of a catalog.

Besides the size of the catalog, the structure of the catalog may vary in different embodiments. One embodiment of a catalog is illustrated in FIG. 4. The catalog 400 includes a header 410 and two sections 420 and 430. Note that other embodiments may include different number of sections, such as three, four, five, etc. Each section contains entries of a list of buffers cataloged during a given check point interval. A buffer may be identified by various identifications, such as fsid, fileid, level, and fbn, etc. Each section in the catalog may correspond to a distinct section in a log storing operation to be replayed in a non-volatile storage device in the storage server, such as an nvlog.

In one embodiment, processing logic implements check points (CP) between some predetermined intervals. The sections in the catalog may be assigned to different CP intervals to catalog buffers during the corresponding CP interval. For instance, for a catalog having two sections, a first section in the catalog may be assigned to the current CP interval while the second section in the catalog may be assigned to the next CP interval. Likewise, the sections in the log may be assigned to different CP intervals in a similar manner. At the end of the current CP interval, the entries from the first section may be discarded by updating the entry count in the header of the catalog. Then the first section may be assigned to the CP interval following the next CP interval and the second section becomes corresponding to the new current CP interval. This process may repeat between the first and the second sections while the storage server is running. Therefore, the buffer may be cataloged in the first or the second section depending on which CP interval the cataloging occurs in. During a log replay, the operations logged in the section of the log corresponding to the current CP may be replayed.

In one embodiment, each buffer contains two counts, which may be referred to as cp_count's, corresponding to the last two CP intervals in which the buffer has been cataloged. Processing logic may use the cp_count's to check whether the buffer has already been cataloged in processing block 320. Each CP interval has a cp_count. A buffer is tagged with up to two cp_count's that correspond to the two CP intervals in progress. The buffer may be cataloged in either one of the CP intervals. These tags are updated as the buffer is cataloged in newer CP intervals. In an alternative embodiment, a hash table of buffers cataloged in a given CP interval is maintained. The hash table may have keys corresponding to the identification of the buffer (e.g., fsid, fileid, level, fbn). The values corresponding to the key may be 1 (i.e., the buffer has been cataloged) or 0 (i.e., the buffer has not been cataloged).

A copy of the catalog may be stored in the memory of the storage server. Furthermore, there may be additional copies of the catalog stored in the local NVRAM (e.g., the local NVRAM 112 in FIG. 1) of the storage server and the partner NVRAM (e.g., the partner NVRAM 122 in FIG. 1) of a partner storage server of the storage server if the networked storage system has adopted a CFO configuration. The copying of the catalog from the memory to the local NVRAM and/or the partner NVRAM is referred to as mirroring.

Referring back to FIG. 3A, processing logic may mirror the catalog to the local NVRAM 112 and the partner NVRAM 122 in a partner storage server 120 in FIG. 1 (processing block 330). Processing logic may mirror the catalog in several ways. For example, processing logic may update the catalog in the local NVRAM 112 and/or the partner NVRAM 122 every time the catalog in the memory is changed. However, such updates may take up too much time and thus, impact the performance of the storage server. Therefore, in an alternative embodiment, processing logic automatically batches multiple updates in one larger transfer to the local NVRAM and/or the partner NVRAM. Such an update mechanism may also be referred to as a "lazy update mechanism".

In one embodiment, the lazy update mechanism provides a first processing thread devoted to mirroring the catalog to the local NVRAM 112 and a second processing thread devoted to mirroring the catalog to the partner NVRAM 122. The first and second processing threads are signaled whenever new entries are added to the catalog. Each thread maintains a shadow state in the memory corresponding to the state of the catalog when the catalog was last mirrored to either the local NVRAM 112 and/or the partner NVRAM 122. Whenever the processing threads wake up and determine that there is a difference between the shadow state and the current state of the catalog, a new transfer to the local NVRAM 112 and/or the partner NVRAM 122 may be initiated.

However, new transfers may not be initiated when other ongoing transfers are still in progress. Once all pending transfers are completed, all the pending updates to the destination catalog in the local NVRAM 112 and/or the partner NVRAM 122 are batched and sent over to the destination catalog together. Processing logic may adopt a natural feedback-based batch algorithm, such as the Nagle's algorithm, which reduces the number of accesses to the local NVRAM 112 and/or partner NVRAM 122. Once a new transfer has been initiated, the shadow copy may be updated to reflect the updated state of the destination catalog.

Each catalog section may also contain a generation count used by processing logic in mirroring the catalog. The generation count may be increased each time a CP completes and the number of entries in the corresponding catalog section is zeroed out as the entries are discarded. If the processing threads devoted to mirroring the catalog find that the generation count for a section has changed as compared to the shadow state, the processing threads may first initiate an update of the copy of the catalog in the local NVRAM 112 and/or the partner NVRAM 122 to zero out the entry count. This may prevent the copy of the catalog in the local NVRAM 112 and/or the partner NVRAM 122 from becoming a mixture of entries cataloged in different CP intervals.

Referring back to FIG. 3A, processing logic determines whether all buffers have been checked (processing block 335). If there is at least one buffer not yet checked, then processing logic goes to the next buffer used in the transaction (processing block 340) and repeats processing block 315. Otherwise, processing logic transitions to processing block 345 to generate a log for log replay.

Figure 3B:
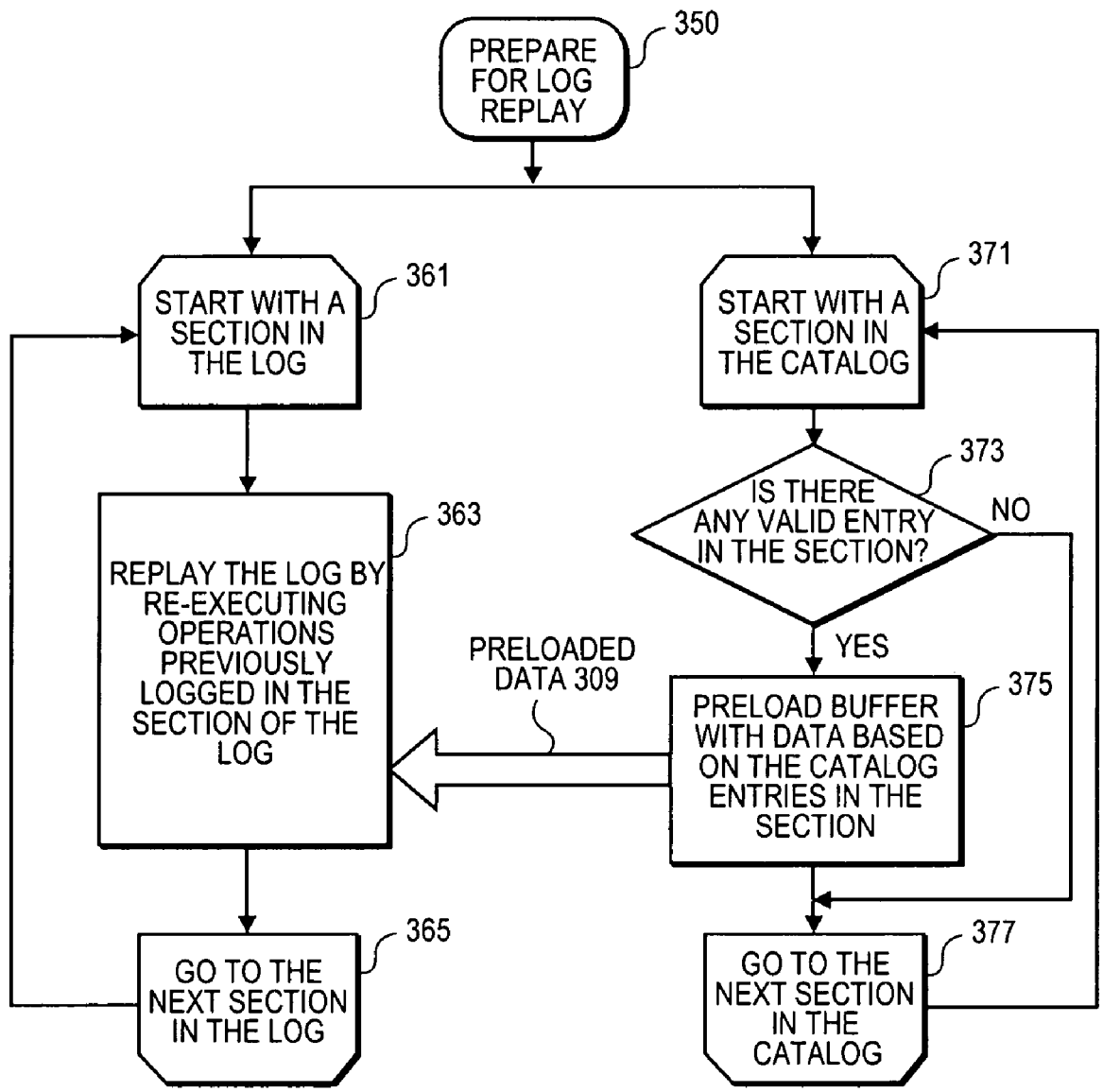
FIG. 3B illustrates a flow diagram of one embodiment of a process to preload buffers.

In one embodiment, when a failure or fault occurs in the networked storage system, the storage server may be rebooted. Alternatively, if the networked storage system has adopted a CFO configuration, the partner storage server may take over. In either case, the buffers are preloaded and the log is replayed. FIG. 3B illustrates a flow diagram of one embodiment of a process to preload buffers in log replay. Again, the process is performed by processing logic that may comprise hardware (e.g., circuitry, dedicated logic, etc.), software (such as is run on a general-purpose computer system or a dedicated machine, such as the storage server 110 and/or the partner storage server 120 in FIG. 1), or a combination of both.

In one embodiment, processing logic preloads buffers and performs log replay substantially in parallel. To preload buffers, processing logic starts with the first section in the catalog (processing block 371). The catalog may be the copy stored in the local NVRAM 112 or the partner NVRAM 122. Preloading for a given catalog section may be initiated if the corresponding replay log section has at least one valid entry to be replayed. Furthermore, preloading for the sections in the catalog may be initiated in the order the sections in the replay log are replayed. Processing logic determines whether there is any valid entry in the section of the catalog (processing block 373). If there is no valid entry in the section, processing logic transitions to processing block 377. Otherwise, processing logic preloads a buffer with data based on each entry in the catalog in the section (processing block 375). Then processing logic goes to the next section in the catalog (processing block 377). Preloading for the next section may start substantially immediately after preloading for the previous section has been finished, without waiting for the replay of the corresponding replay log section to be completed.

As processing logic is preloading buffers, processing logic also starts performing log replay. In one embodiment, processing logic starts with the first section in a log (e.g., an nvlog) that stores the modifying operations in transactions serviced within a predetermined period before the system failure, such as the CP interval in which the failure has occurred (processing block 361). Processing logic replays the log by re-executing the operations logged in the current section of the log (processing block 363). To re-execute the operations logged, processing logic uses data specified in the operations. If such data has not yet been preloaded into the buffers yet, processing logic has to wait while the data is being fetched. However, if such data has already been preloaded (e.g., the preloaded data 309) in processing block 375, processing logic may re-execute the operations without waiting for the data to be fetched, and hence, saving time in performing log replay. A further advantage of preloading buffers is that by sending a larger number of input/output (i/o) requests to the mass storage devices, the mass storage devices (e.g., disks) may better optimize data accesses to allow speedier retrieval of large amounts of data. For instance, a disk may service i/o requests that access data in a common region (e.g., a segment) on the disk at or about the same time in order to reduce the time spent on rotating the disk to different regions.

In an alternative embodiment, i/o's are generated during the preloading of buffers and are sorted in the storage system software. Thus, the i/o's are not sorted by the storage driver in the storage server or partner storage server or the mass storage devices themselves. This technique may be more efficient when the mass storage devices have a relatively small queue depth. After processing logic is done with the current section of the log, processing logic goes to the next section in the log to continue with the log replay (processing block 365).

Figure 5:
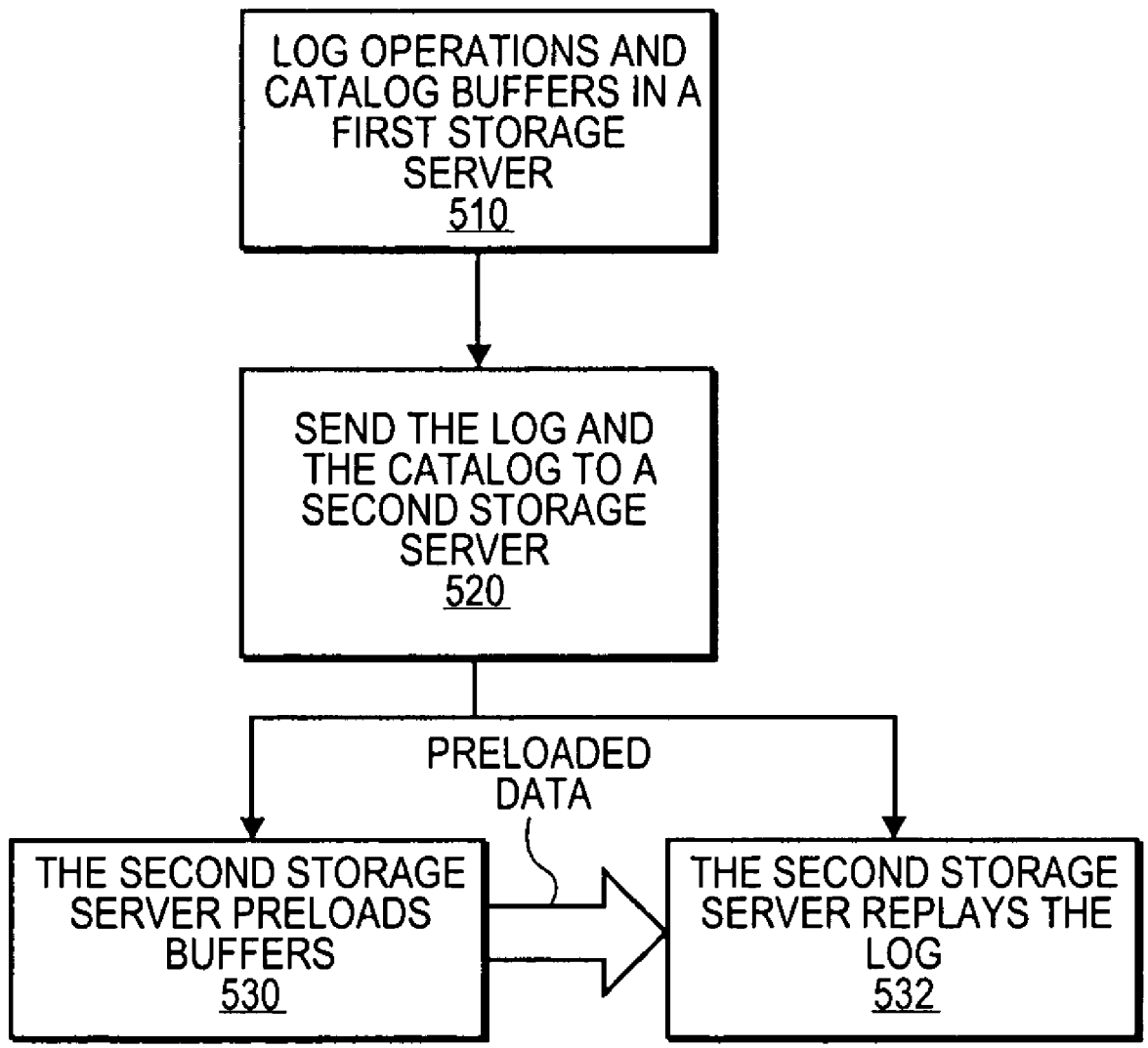
FIG. 5 illustrates a flow diagram of one embodiment of a process to implement synchronous mirroring of networked storage system data using log replay.

FIG. 5 illustrates a flow diagram of one embodiment of a process to implement synchronous mirroring of networked storage system data using log replay. Again, the process is performed by processing logic that may comprise hardware (e.g., circuitry, dedicated logic, etc.), software (such as is run on a general-purpose computer system or a dedicated machine, such as the storage server 110 and/or the partner storage server 120 in FIG. 1), or a combination of both.

In one embodiment, a first storage server logs operations and catalogs buffers that are modified in the operations (processing block 510). In some embodiments, the operations logged are modifying operations (e.g., write operation). Then processing logic sends the log and the catalog to a second storage server coupled to the first storage server (processing block 520). The second storage server starts preloading buffers when the second storage server receives a catalog entry from the first storage server (processing block 530). When the second storage server receives the log entry, the second storage server replays the log. In some embodiments, by the time the second storage server receives the log entry, the buffers have been preloaded already, and thus, the log can be replayed more quickly. By replaying the log in the second storage server, the second storage server can maintain a substantially identical networked storage system state as the first storage server, which may be useful in backing up the system to provide disaster recovery.

In some embodiments, processing logic may keep track of the statistics in terms of how often the data used in re-executing the operations has been preloaded. Such statistics may be helpful in evaluating the efficiency of the system and may provide insights into adjusting various parameters, criteria, and/or conditions involved, such as the criteria used in determining whether to catalog a buffer in processing block 315 in FIG. 3A.

The foregoing discussion merely describes some exemplary embodiments of the present invention. One skilled in the art will readily recognize from such discussion, the accompanying drawings and the claims that various modifications can be made without departing from the spirit and scope of the invention.

The invention claimed is:

1. A computerized method comprising:
   sending, from a storage server to a partner storage server, a catalog indicating which buffers of the storage server are used in a transaction;
   preloading, on the partner storage server, a buffer according to the catalog;
   sending, from the storage server to the partner storage server, a log containing a plurality of modifying operations associated with the transaction; and
   replaying, on the partner storage server, the log using data in the preloaded buffer to maintain a state in the partner storage server that is substantially identical to a state in the storage server, wherein preloading a buffer according to the catalog and replaying the log are executed substantially in parallel.

2. The method of claim 1, further comprising:
   determining that data in a buffer of the storage server will be changed due to the transaction; and
   cataloging the buffer to be changed.

3. The method of claim 1, wherein the catalog is divided into a plurality of sections, each section to contain a plurality of buffers cataloged at a distinct time interval.

4. A storage server comprising:
   a processor; and
   a memory coupled with the processor and storing instructions which, when executed by the processor, cause the processor to
      send, from the storage server to a partner storage server, a catalog indicating which buffers of the storage server are used in a transaction, the catalog to be used by the partner storage sever to preload, on the partner storage server, a buffer according to the catalog, and
      a log containing a plurality of modifying operations associated with the transaction, the log to be used by the partner storage server to replay, on the partner storage server, the modifying operations using data in the preloaded buffer, to maintain a state in the partner storage server that is substantially identical to a state in the storage server, wherein preloading a buffer according to the catalog and replaying the log are to be executed substantially in parallel.

5. The storage server of claim 4, wherein the processor further:
   determines that data in a buffer of the storage server will be changed due to the transaction; and
   catalogs the buffer to be changed.

6. The storage server of claim 4, wherein the catalog is divided into a plurality of sections, each section to contain a plurality of buffers cataloged at a distinct time interval.

7. A partner storage server comprising:
   a processor; and
   a memory coupled with the processor and storing instructions which, when executed by the processor, cause the processor to
      preload, on the partner storage server, a buffer according to a catalog received from a storage server, the catalog indicating which buffers of the storage server are used in a transaction, and
      replay, on the partner storage server, a log using data in the preloaded buffer to maintain a state in the partner storage server that is substantially identical to a state in the storage server, the log received from the storage server and containing a plurality of modifying operations associated with the transaction, wherein preloading a buffer according to the catalog and replaying the log are executed substantially in parallel.

8. A system comprising:
   a storage server comprising a first processor and a first memory, the first memory coupled with the first processor and storing a first set of instructions; and a partner storage server, coupled with the storage server, and comprising a second processor and a second memory, the second memory coupled with the second processor and storing a second set of instructions, wherein the first set of instructions causing the storage server to send to the partner storage server a catalog indicating which buffers of the storage server are used in a transaction, and a log containing a plurality of modifying operations associated with the transaction, and wherein the second set of instructions causing the partner storage server to preload a buffer according to the catalog, and replay the log using data in the preloaded buffer to maintain a state in the partner storage server that is substantially identical to a state in the storage server, wherein preloading a buffer according to the catalog and replaying the log are executed substantially in parallel.

9. The system of claim 8, wherein the storage server further:

determines that data in a buffer of the storage server will be changed due to the transaction; and catalogs the buffer to be changed.

10. The system of claim 8, wherein the catalog is divided into a plurality of sections, each section to contain a plurality of buffers cataloged at a distinct time interval.

* * * * *